(12) United States Patent
Nakazawa

(10) Patent No.: US 10,312,769 B2
(45) Date of Patent: Jun. 4, 2019

(54) MOTOR HAVING AIR PATH OF STATOR, OR FAN CLEANABLE, AND CLEANING SYSTEM OF MOTOR

(71) Applicant: FANUC CORPORATION, Yamanashi (JP)

(72) Inventor: Yasuyuki Nakazawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/876,901

(22) Filed: Oct. 7, 2015

(65) Prior Publication Data

US 2016/0105069 A1    Apr. 14, 2016

(30) Foreign Application Priority Data

Oct. 10, 2014  (JP) .................................. 2014-209350

(51) Int. Cl.
| H02K 5/20 | (2006.01) |
| H02K 9/04 | (2006.01) |
| H02K 15/00 | (2006.01) |

(52) U.S. Cl.
CPC ................ *H02K 5/20* (2013.01); *H02K 9/04* (2013.01); *H02K 15/00* (2013.01)

(58) Field of Classification Search
CPC .. H02K 9/02; H02K 9/04; H02K 9/06; H02K 9/08; H02K 5/20; H02K 5/22; H02K 5/225
USPC ........ 310/89, 58, 59, 60 R, 61, 62, 63, 60 A
See application file for complete search history.

(56) References Cited

U.S. PATENT DOCUMENTS

| 6,078,115 | A * | 6/2000 | Uchida | ..................... B23Q 5/10 |
| | | | | 310/58 |
| 6,570,276 | B1 * | 5/2003 | Morel | ....................... H02K 9/06 |
| | | | | 310/52 |
| 9,680,340 | B2 * | 6/2017 | Noack | ....................... H02K 1/20 |
| 2004/0150270 | A1 * | 8/2004 | Nagayama | ............... H02K 1/32 |
| | | | | 310/61 |
| 2006/0226717 | A1 * | 10/2006 | Nagayama | ............... H02K 9/14 |
| | | | | 310/58 |
| 2007/0024129 | A1 * | 2/2007 | Pfannschmidt | .......... H02K 1/20 |
| | | | | 310/59 |
| 2011/0109176 | A1 * | 5/2011 | Yoshimura | ............... H02K 5/20 |
| | | | | 310/64 |
| 2013/0241329 | A1 * | 9/2013 | Yagi | ................... H02K 15/0006 |
| | | | | 310/63 |

FOREIGN PATENT DOCUMENTS

| CN | 2062515 U | 9/1990 |
| CN | 1848620 A | 10/2006 |

(Continued)

OTHER PUBLICATIONS

English Translation of JP 06066276 from JPO.*

(Continued)

*Primary Examiner* — Bernard Rojas
*Assistant Examiner* — Maged M Almawri
(74) *Attorney, Agent, or Firm* — Fredrikson & Byron, P.A.

(57) ABSTRACT

Provided is a motor enabling more simple and efficient cleaning of the inside of an air path. The motor includes a stator, a housing which holds the stator, a fan arranged outside the stator, a fan cover which houses the fan and is mounted on the housing, an air path including an inlet and an outlet for a cooling gas, and a first cleaning hole extending from a first opening that faces and opens to the air path at a position closer to the outlet than the inlet to a second opening which opens to the outside.

8 Claims, 13 Drawing Sheets

(56) References Cited

FOREIGN PATENT DOCUMENTS

| | | | |
|---|---|---|---|
| CN | 102055279 A | | 5/2011 |
| CN | 102783001 A | | 11/2012 |
| CN | 205092669 U | | 3/2016 |
| DE | 102010036831 A1 | | 5/2011 |
| JP | S63114544 | * | 5/1988 |
| JP | 63316653 A | | 12/1988 |
| JP | 06066276 | * | 2/1993 |
| JP | 06066276 | * | 6/1994 |
| JP | 06066276 | * | 9/1994 |
| JP | 06066276 U | | 9/1994 |
| JP | 06311709 A | | 11/1994 |
| JP | 2007020258 A | | 1/2007 |

OTHER PUBLICATIONS

JP 06066276 English Translation.*
JPS63114544 English Translation.*
English Abstract and Machine Translation for Japanese Publication No. 2007-020258 A, published Jan. 25, 2007, 6 pgs.
English Abstract and Machine Translation for Japanese Publication No. JP 63-316653 A, published Dec. 23, 1988, 7 pgs.
English Machine Translation for Japanese Publication No. JP 06-066279 U, published Sep. 16, 1994, 6 pgs.
English Abstract and Machine Translation for Japanese Publication No. JP 06-311709 A, published Nov. 4, 1994, 7 pgs.
English Abstract and Machine Translation for Chinese Publication No. 205092669 U, published Mar. 16, 2016, 11 pgs.
English Abstract and Machine Translation for Chinese Publication No. 102783001 A, published Nov. 14, 2012, 11 pgs.
English Abstract and Machine Translation for Chinese Publication No. 102055279 A, published May 11, 2011, 6 pgs.
English Abstract and Machine Translation for Chinese Publication No. 1848620 A, published Oct. 18, 2006, 13 pgs.
English Abstract and Machine Translation for Chinese Publication No. 2062515 U, published Sep. 19, 1990, 4 pgs.
English Machine Translation for German Publication No. 102010036831 A1, published May 12, 2011, 6 pgs.

* cited by examiner

MOTOR HAVING AIR PATH OF STATOR, OR FAN CLEANABLE, AND CLEANING SYSTEM OF MOTOR

BACKGROUND ART

1. Field of the Invention

The invention relates to a motor having an air path of a stator, or a fan cleanable, and a cleaning system of the motor.

2. Description of the Related Art

To cool a stator and a rotor during operation of a motor, the motor including a fan, and an air path arranged around the stator and in the rotor in such a manner as to communicate with the fan and allowing an airflow generated by the fan to pass through the interior is known. Conventionally, in such a motor, various elements for cleaning the inside of the air path have been proposed (for example, Japanese Laid-open Patent Publication No. 2007-20258).

A technique which enables more simple and efficient cleaning of the inside of the air path has been demanded.

SUMMARY OF THE INVENTION

In an aspect of the invention, a motor comprises a stator, a housing which holds the stator, a fan arranged outside the stator, and a fan cover mounted on the housing and housing the fan.

Further, the motor comprises an air path provided at the stator or the housing and including an inlet and an outlet for a cooling gas; and a first cleaning hole formed at the stator, the housing, or the fan cover, and extending from a first opening which opens to face the air path at a position closer to the outlet than the inlet to a second opening which opens to an outside.

The motor may comprise a plurality of air paths, and a plurality of first cleaning holes arranged to face the respective air paths. The first opening may be arranged at a position separated from the outlet so as to face the outlet.

The first opening may be arranged between the inlet and the outlet. An inner wall of the first cleaning hole may be threaded. The motor may further comprise a second cleaning hole formed at the stator, the housing, or the fan cover, and extending from a third opening which opens to face the fan to a fourth opening which opens to the outside.

The second opening and the fourth opening may be the same one opening. The second cleaning hole may extend from the third opening so as to be connected to the first cleaning hole. The housing may include a hollow part extending between the stator and the fan cover, and having an inner space which is in fluid communication with the air path and the inside of the fan cover. The first cleaning hole may be formed at the hollow part.

In another aspect of the invention, a cleaning system for cleaning the inside of the stator as described above comprises a fluid supply device for supplying a compressed fluid into the first cleaning hole, and a controller for controlling the fluid supply device.

BRIEF DESCRIPTION OF THE DRAWINGS

The above and other objects, features, and advantages of the invention will be clarified by the following description of embodiments with reference to the accompanying drawings, in which.

DETAILED DESCRIPTION

Figure 1:
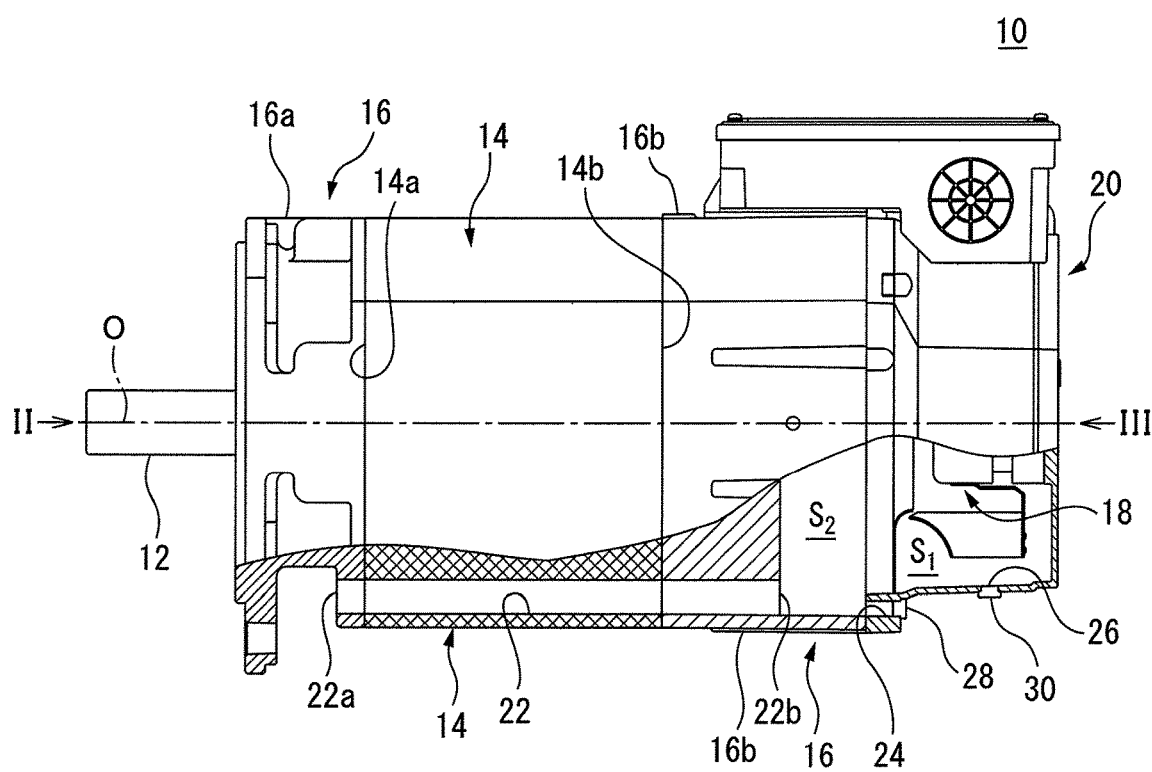
FIG. 1 is a side view of a motor according to an embodiment of the invention, in which a part of the motor is shown cross-sectionally.

Hereinafter, embodiments of the invention will be described with reference to the accompanying drawings. First, a motor 10 according to an embodiment of the invention will be described with reference to FIGS. 1-4. Note that, in the below description, an axial direction refers to a direction along a rotation axis O of a shaft 12 shown in FIG. 1, a radial direction refers to a direction of radius of a circle centered about the axis O, and a circumferential direction refers to a circumferential direction of a circle centered about the axis O. Meanwhile, axial frontward refers to a leftward direction as viewed in FIG. 1.

The motor 10 includes a shaft 12, a stator 14, a housing 16, a fan 18, and a fan cover 20. The shaft 12 is provided as to be rotatable relative to the stator 14. A rotor (not shown) is fixed to the radially outside of the shaft 12. The stator 14 is comprised of e.g. a plurality of magnetic steel plates stacked in the axial direction, and is fixed to be separated radially outward of the shaft 12.

The housing 16 supports the stator 14. In this embodiment, the housing 16 includes a front housing 16a arranged at an axially front (second direction) end 14a of the stator 14 and a rear housing 16b arranged at an axially rear (first direction) end 14b of the stator 14.

Figure 3:
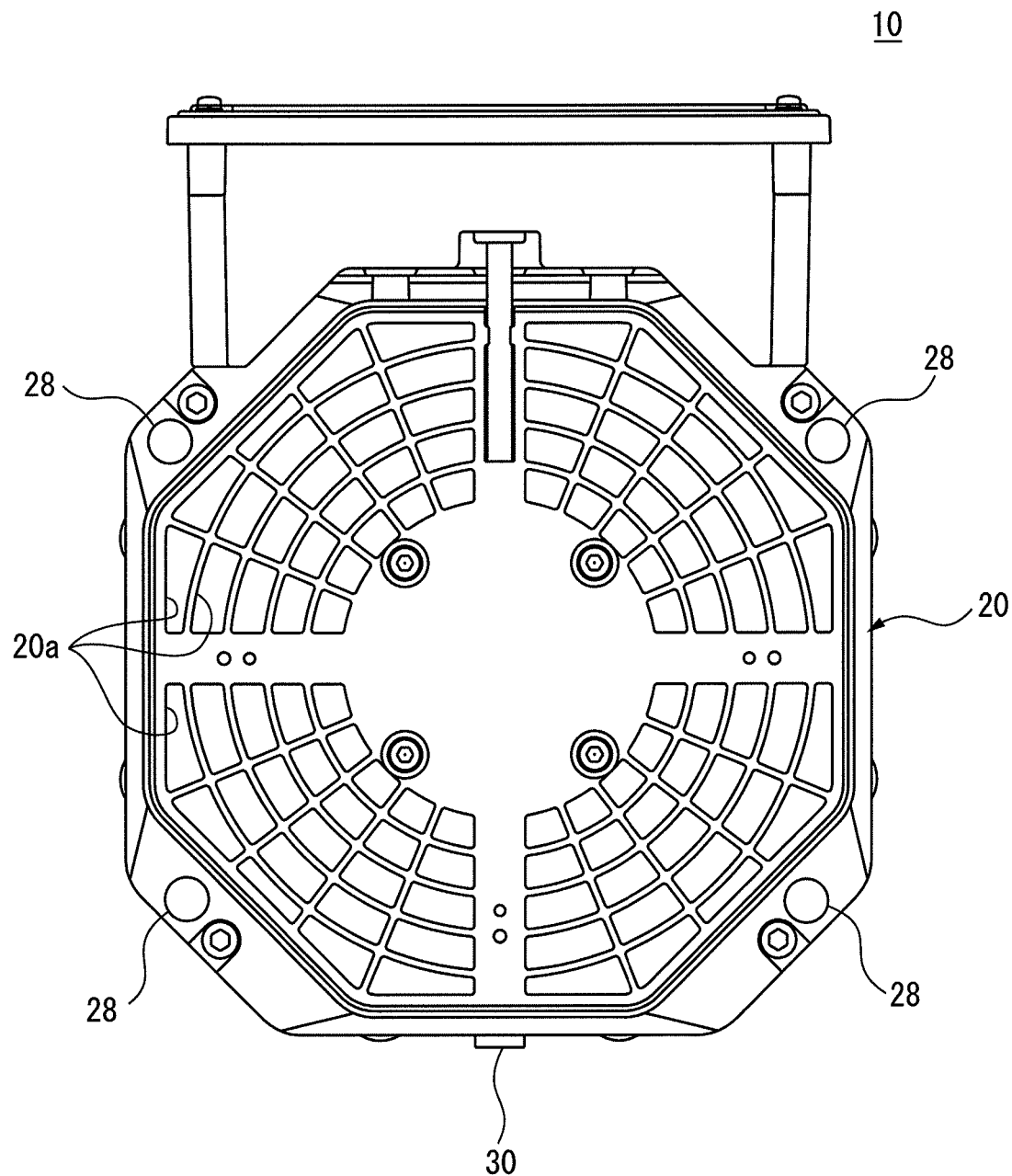
FIG. 3 is a view of the motor shown in FIG. 1 when seen from axially rear side, i.e., from an arrow III in FIG. 1.

The fan 18 is e.g. a centrifugal fan which generates an airflow in the axial direction by rotating a rotational body having a plurality of banes. The fan 18 is arranged to be separated axially rearward of the stator 14. The fan cover 20 is fixed to the rear housing 16*b*, and houses the fan 18 in an inner space $S_1$ thereof. As shown in FIG. 3, the fan cover 20 is formed with a plurality of fan holes 20*a* which allow an outside air to flow into the inner space $S_1$ and an air in the inner space $S_1$ to flow out thereof.

The motor 10 further includes an air path 22 for cooling the stator 14 during operation. In this embodiment, the air path 22 is defined by a through hole formed at a radially outer part of the stator so as to penetrate the stator 14 in the axial direction.

Specifically, the air path 22 extends in the axial direction from an opening 22*a* (inlet) at axially frontward to an opening 22*b* (outlet) at axially rearward. The opening 22*a* is arranged at the front housing 16*a* in the vicinity of the axially front end 14*a* of the stator 14, and opens to outside of the motor 10.

On the other hand, the opening 22*b* is arranged at the rear housing 16*b* in the vicinity of the axially front end 14*b* of the stator 14, and opens to an inner space $S_2$ defined inside of the rear housing 16*b*. The inner space $S_2$ is in fluid communication with the inner space $S_1$ of the fan cover 20. Therefore, the opening 22*b* is in fluid communication with the inner space $S_1$ of the fan cover 20 through the inner space $S_2$.

Figure 2:
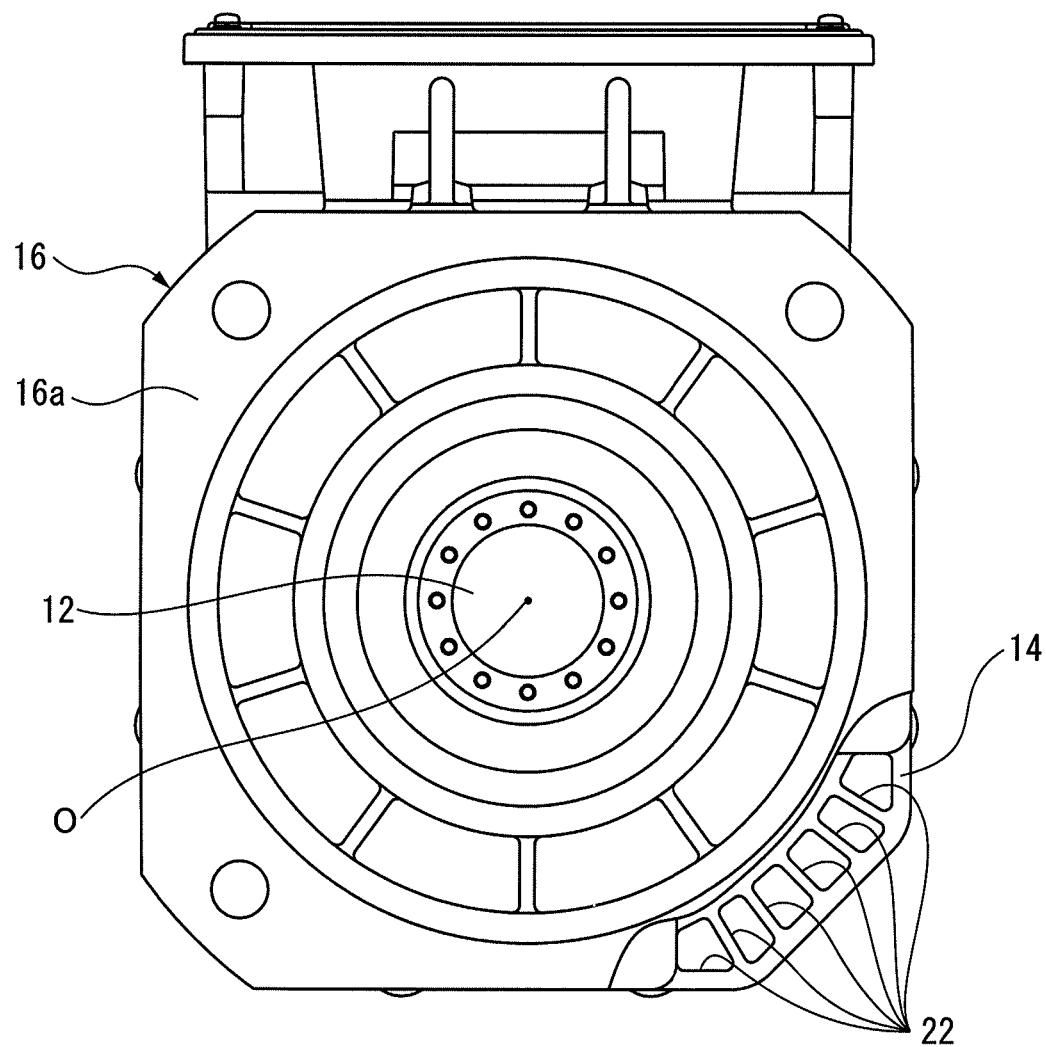
FIG. 2 is a view of the motor shown in FIG. 1 when seen from axially front side, i.e., from an arrow II in FIG. 1, in which a part of the front housing of the motor is omitted.

In this embodiment, as shown in FIG. 2, the stator 14 is formed with a plurality of air paths 22 arranged in the circumferential direction. Note that, instead of the plurality of air paths 22, only one air path 22 may be provided.

The motor 10 further includes a first cleaning hole 24 for supplying a compressed fluid from outside into the air path 22. In this embodiment, the first cleaning hole 24 is constituted by a through hole formed at the fan cover 20 so as to extend in the axial direction. The first cleaning hole 24 is arranged to face one of the plurality of air paths 22.

Figure 4:
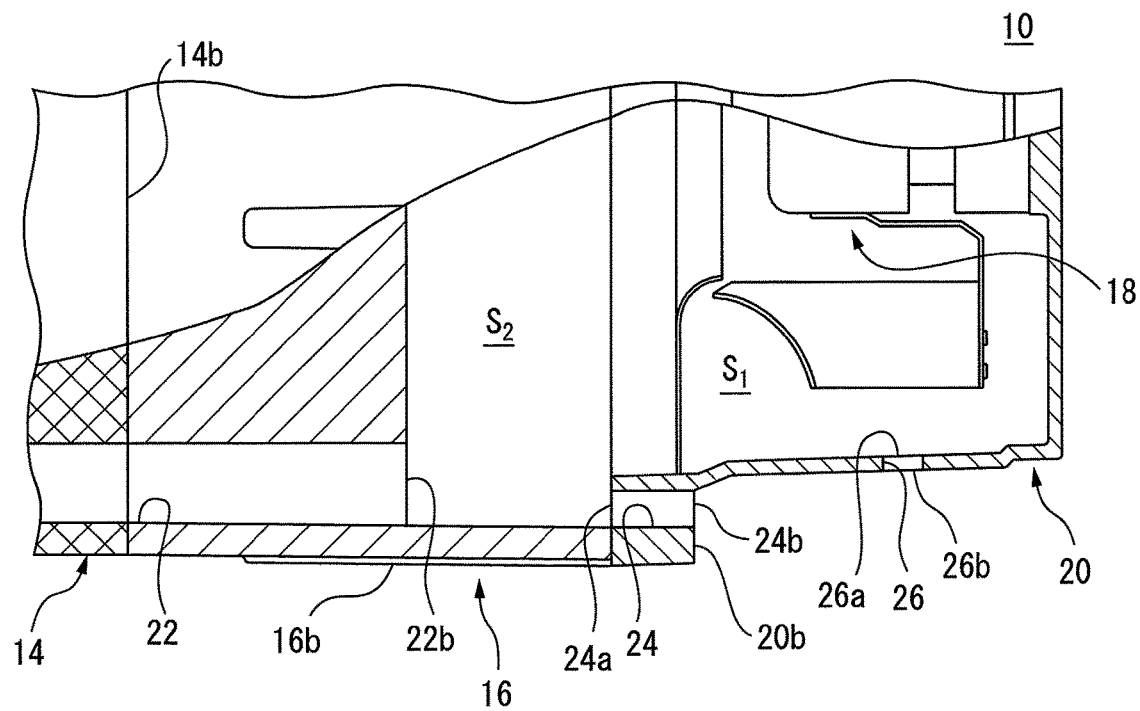
FIG. 4 is an enlarged view of a section in FIG. 1, in which the plug in FIG. 1 is omitted.

Specifically, as shown in FIG. 4, the first cleaning hole 24 extends in the axial direction from an opening 24*a* (first opening) to an opening 24*b* (second opening). The opening 24*a* is arranged axially rearward of the opening 22*b* of the air path 22 so as to face the opening 22*b*. Thus, the opening 24*a* is arranged closer to the opening 22*b* than the opening 22*a* of the air path 22.

More specifically, the opening 24*a* is arranged relative to the opening 22*b* so that at least a part of a projection region of the opening 24*a* (for example, 30% or more) overlaps with the opening 22*b* when the opening 24*a* is projected axially frontward so as to overlap with the opening 22*b* of the air path 22. On the other hand, the opening 24*b* opens to the outside on an outer surface 20*b* of the fan cover 20.

The motor 10 further includes a second cleaning hole 26 for supplying the compressed fluid from the outside to the fan 18. In this embodiment, the second cleaning hole 26 is constituted by a through hole formed at the fan cover 20 so as to extend in the radial direction.

Specifically, the second cleaning hole 26 extends from an opening 26*a* (third opening) which opens to the inner space $S_1$ so as to face the fan 18 to an opening 26*b* (fourth opening) which opens to the outside on the outer surface 20*b* of the fan cover 20. The opening 26*a* is arranged adjacent to the fan 18 at radially outside of the fan 18.

As shown in FIGS. 1 and 3, the first cleaning hole 24 and the second cleaning hole 26 are ordinarily plugged with plugs 28 and 30, respectively. The plugs 28 and 30 are removed from the first cleaning hole 24 and the second cleaning hole 26, respectively, when cleaning the inside of the motor 10, and a compressed fluid is introduced into each of the first cleaning hole 24 and the second cleaning hole 26 from a fluid supply device or the like (not shown) provided outside. Note that, a cleaning operation on the motor 10 will be described later.

Next, the function of the motor 10 according to this embodiment will be described with reference to FIGS. 1-4. When the motor 10 is operated, heat is generated in the stator 14, so it is necessary to cool the stator 14. For this, the fan 18 is driven to generate an airflow which flows axially rearward.

Then, an outside air (cooling gas) flows into the air path 22 through the opening 22*a*, flows through the air path 22 axially rearward, and flows out from the opening 22*b* of the air path 22 into the inner space $S_2$ through. The airflow flowing out from the opening 22*b* passes the inner space $S_2$, then reaches the fan 18, and then is discharged from the fan holes 20*a* of the fan cover 20 to the outside. By the airflow flowing through the air path 22 in such a manner, the heat generated in the stator 14 is removed, whereby the stator 14 is cooled.

As the outside air is introduced into the air path 22 to cool the stator 14, dusts or the like contained in the outside air may gradually adhere to the inside of the air path 22. Further, dusts which have entered the air path 22 may be carried by the airflow to reach the fan 18, and adhere to the fan 18.

In this regard, in the motor 10 according to this embodiment, a compressed fluid is fed into the first cleaning hole 24 and the second cleaning hole 26 to sweep out the dusts adhering to the air path 22 and the fan 18, whereby the air path 22 and the fan 18 of the motor 10 can be cleaned.

Figure 5:
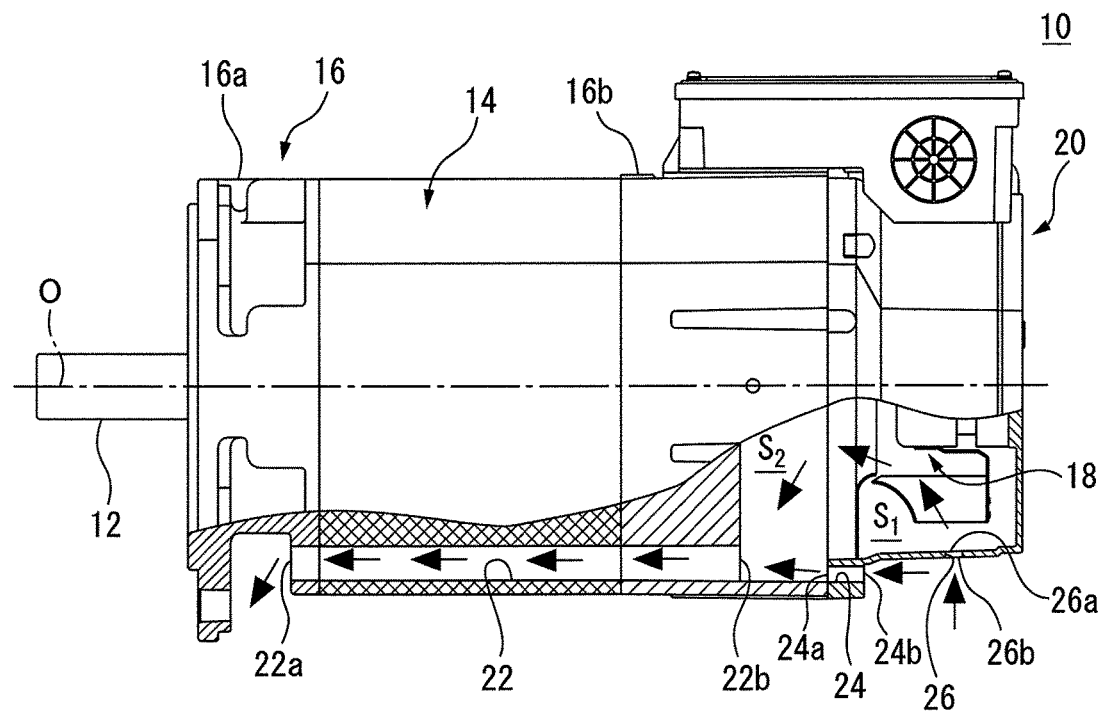
FIG. 5 is a diagram for describing airflow when cleaning the air path of the stator or the fan of the motor shown in FIG. 1.

Hereinafter, the flows of the compressed fluid during cleaning of the air path 22 and the fan 18 of the motor 10 will be described with reference to FIG. 5. The compressed fluid introduced into the first cleaning hole 24 via the opening 24*b* flows axially frontward and is discharged axially frontward from the opening 24*a*.

As described above, the opening 24*a* is arranged to face the opening 22*b* of the air path 22. Accordingly, the compressed fluid discharged from the opening 24*a* of the first cleaning hole 24 is effectively introduced into the air path 22 through the opening 22*b*.

Further, according to this embodiment, the first cleaning hole 24 is formed so as to axially extend. Accordingly, the compressed fluid introduced into the first cleaning hole 24 is oriented to be discharged axially frontward, i.e., toward the opening 22*b* of the air path 22. Due to this, the compressed fluid can be introduced into the air path 22 more effectively.

The compressed fluid flown into the air path 22 via the opening 22*b* flows through the air path 22 axially frontward, and is discharged from the opening 22*a* to the outside. As the compressed fluid passes through the air path 22, the dusts adhering into the air path 22 are gradually swept away, and are discharged from the opening 22*a* to the outside together with the compressed fluid.

Thus, according to this embodiment, it is possible to sweep out the dusts adhering into the air path 22 only by introducing the compressed fluid into the first cleaning hole 24. Therefore, it is not necessary to disassemble the motor 10 for cleaning the inside of the air path 22, so the air path 22 can be cleaned in an easy and cost-effective manner.

On the other hand, a compressed fluid introduced into the second cleaning hole 26 is discharged from the opening 26*a* radially inward. As described above, the opening 26*a* of the second cleaning hole 26 is arranged to face the fan 18.

Accordingly, the compressed fluid discharged from the opening 24a of the first cleaning hole 24 is effectively blown to the fan 18.

The dusts adhering to the fan 18 are blown off due to the compressed fluid blown to the fan 18, pass the inner space $S_2$ together with the compressed fluid, and flow into the air path 22. Then, the dusts join a compressed gas flown from the first cleaning hole 24, and are swept away from the opening 22a of the air path 22 to the outside. Whereby, the dusts adhering to the fan 18 can be swept away to the outside.

Thus, according to this embodiment, it is possible to sweep out the dusts adhering to the fan 18 only by introducing the compressed fluid into the second cleaning hole 26. Accordingly, it is possible to clean the fan 18 in an easy and cost-effective manner, without disassembling the motor 10.

Figure 6:
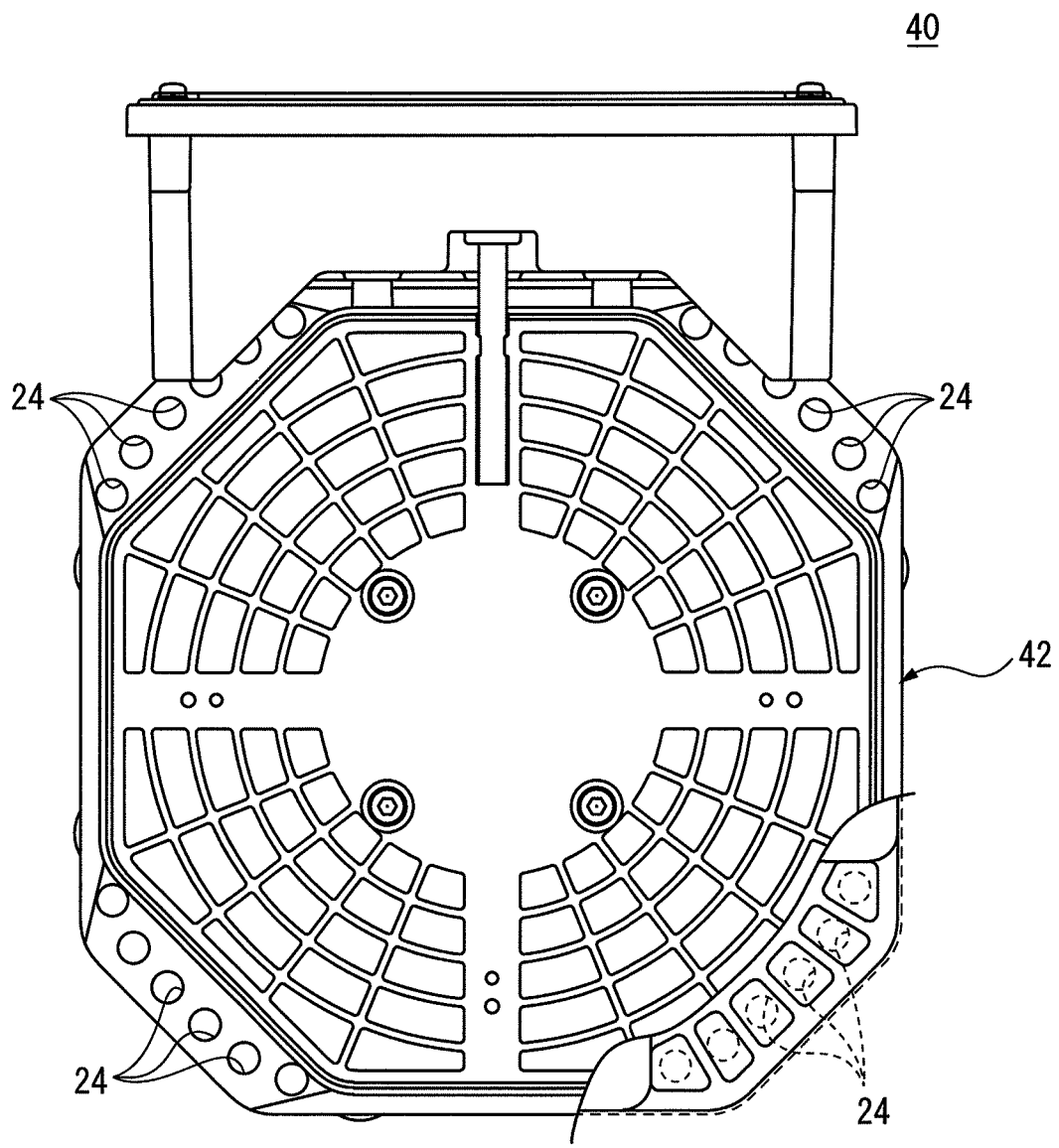
FIG. 6 is a view of a motor according to another embodiment of the invention when seen from axially rear side, in which a part of a rear housing of the motor is omitted.

Next, a motor 40 according to another embodiment of the invention will be described with reference to FIG. 6. Note that, in various embodiments described below, elements similar to those in the already-mentioned embodiments are assigned the same reference numerals, and the detailed description thereof will be omitted. The motor 40 according to this embodiment differs from the above-mentioned motor 10 in a fan cover 42.

Specifically, the motor 40 includes a fan cover 42 which houses a fan (not shown) inside thereof, and the fan cover 42 is formed with a plurality of first cleaning holes 24 arranged to face the respective air paths 22 (see FIG. 2). According to this embodiment, when a compressed fluid is introduced into the first cleaning holes 24, it is possible to effectively introduce the compressed fluid into the respective air paths 22.

Figure 7:
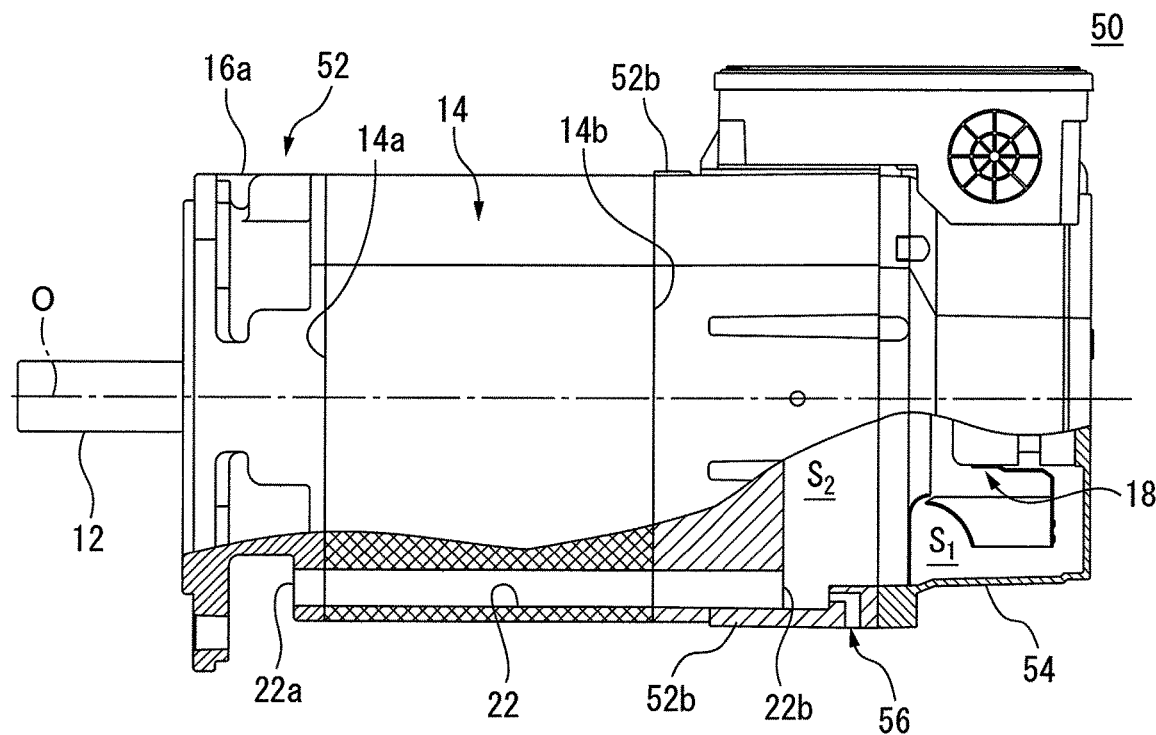
FIG. 7 is a side view of a motor according to still another embodiment of the invention, in which a part of the motor is shown cross-sectionally.
Figure 8:
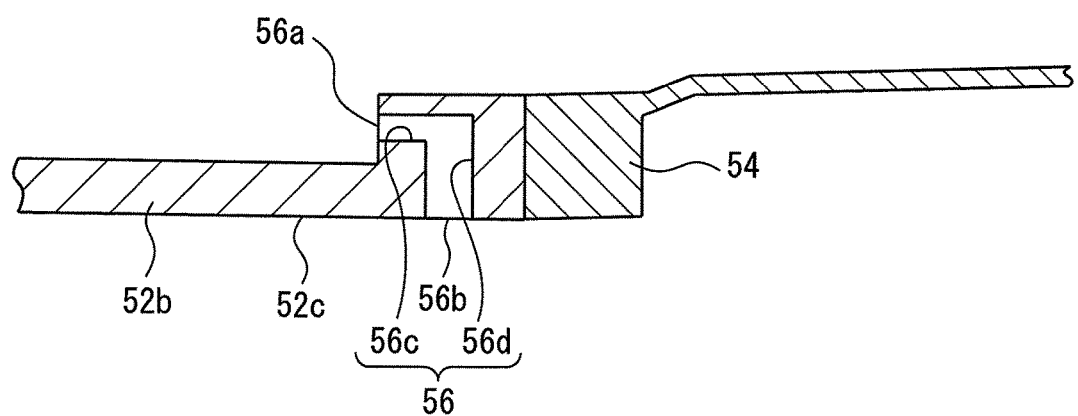
FIG. 8 is an enlarged view of the cleaning hole shown in FIG. 7.

Next, a motor 50 according to still another embodiment of the invention will be described with reference to FIGS. 7 and 8. The motor 50 includes the shaft 12, the stator 14, a housing 52, the fan 18, and a fan cover 54.

The housing 52 according to this embodiment includes the front housing 16a similar to that in the above-mentioned embodiments; and a rear housing 52b arranged at the axially rear end 14b of the stator 14. The fan cover 54 is fixed to the rear housing 52b, and houses the fan 18 in the inner space $S_1$ thereof. The fan cover 54 according to this embodiment has a configuration similar to that of the above-mentioned fan cover 20, except that the second cleaning hole 26 is not formed in the fan cover 54.

The motor 50 further includes a (first) cleaning hole 56 formed at the rear housing 52b. As shown in FIG. 8, the cleaning hole 56 extends from an opening 56a (first opening), which opens so as to face the opening 22b of the air path 22, to an opening 56b (second opening), which opens to the outside on an outer surface 52c of the rear housing 52b.

The cleaning hole 56 includes a first hole part 56c extending from the opening 56a axially rearward; and a second hole part 56d extending in the radial direction from the axially rear end of the first hole part 56c to the opening 56b.

When cleaning the air path 22 of the motor 50, a compressed fluid is fed into the cleaning hole 56. The compressed fluid introduced into the cleaning hole 56 passes through the second hole part 56d and the first hole part 56c, and is discharged from the opening 56a axially frontward.

Since the opening 56a is arranged to face the opening 22b of the air path 22, the compressed fluid discharged from the opening 56a of the cleaning hole 56 is effectively introduced into the air path 22 from the opening 22b.

Further, the first hole part 56c of the cleaning hole 56 is formed so as to extend in the axial direction. Accordingly, the compressed fluid introduced into the cleaning hole 56 is oriented so as to be discharged axially frontward, i.e., toward the opening 22b of the air path 22. Thereby, it is possible to introduce the compressed fluid into the air path 22 more effectively.

Figure 9:
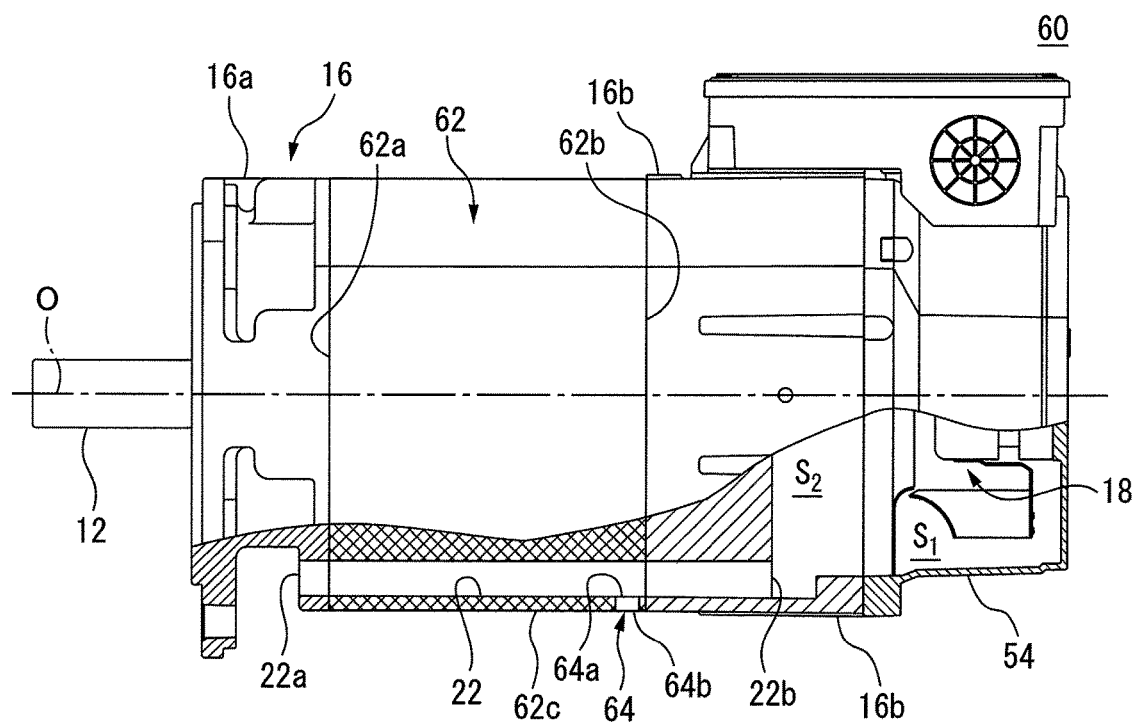
FIG. 9 is a side view of a motor according to still another embodiment of the invention, in which a part of the motor is shown cross-sectionally.

Next, a motor 60 according to still another embodiment of the invention will be described with reference to FIG. 9. The motor 60 includes the shaft 12, a stator 62, the housing 16, the fan 18, and the fan cover 54.

The stator 62 is formed with the air path 22 axially extending from the opening 22a arranged at an axially front end 62a of the stator 62 to the opening 22b arranged in the vicinity of an axially rear end 62b of the stator 62. The motor 60 according to this embodiment includes a (first) cleaning hole 64 formed at the stator 62.

Specifically, the cleaning hole 64 extends from an opening 64a (first opening), which opens to the air path 22 to an opening 64b (second opening) which opens to the outside on an outer surface 62c of the stator 62. The opening 64a is arranged between the opening 22a and the opening 22b of the air path 22 so as to be closer to the opening 22b than the opening 22a of the air path 22, and opens so as to face the air path 22.

When cleaning the air path 22 and the fan 18 of the motor 60, a compressed fluid is fed into the cleaning hole 64. The compressed fluid introduced into the cleaning hole 64 is discharged from the opening 64a into the air path 22. The compressed fluid flowing into the air path 22 is diverged into a flow toward axially frontward from the opening 64a through the air path 22 and a flow toward axially rearward from the opening 64a through the air path 22.

The compressed fluid flowing axially frontward from the opening 64a sweeps away dusts adhering to the passage 22 and is discharged from the opening 22a to the outside. On the other hand, the compressed fluid flowing axially rearward from the opening 64a sweeps away dusts adhering to the passage 22 and is discharged from the opening 22b to the inner space $S_2$.

The compressed fluid discharged from the opening 22b passes the inner space $S_2$ together with the dusts, and flows into the inner space $S_1$ of the fan cover 54, and a part thereof is blown to the fan 18. Thereby, dusts adhering to the fan 18 can be swept away as well. Then, the compressed fluid is discharged to the outside through the fan holes 20a (FIG. 3) formed at the fan cover 54, together with the dusts carried by the compressed fluid.

According to this embodiment, it is possible to sweep out the dusts adhering to the air path 22 and the fan 18 only by introducing the compressed fluid into the cleaning hole 64. Therefore, it is not necessary for the user to disassemble the motor 10 for cleaning the air path 22, so the air path 18 and the fan 18 of the motor 60 can be cleaned in an easy and cost-effective manner.

Figure 10:
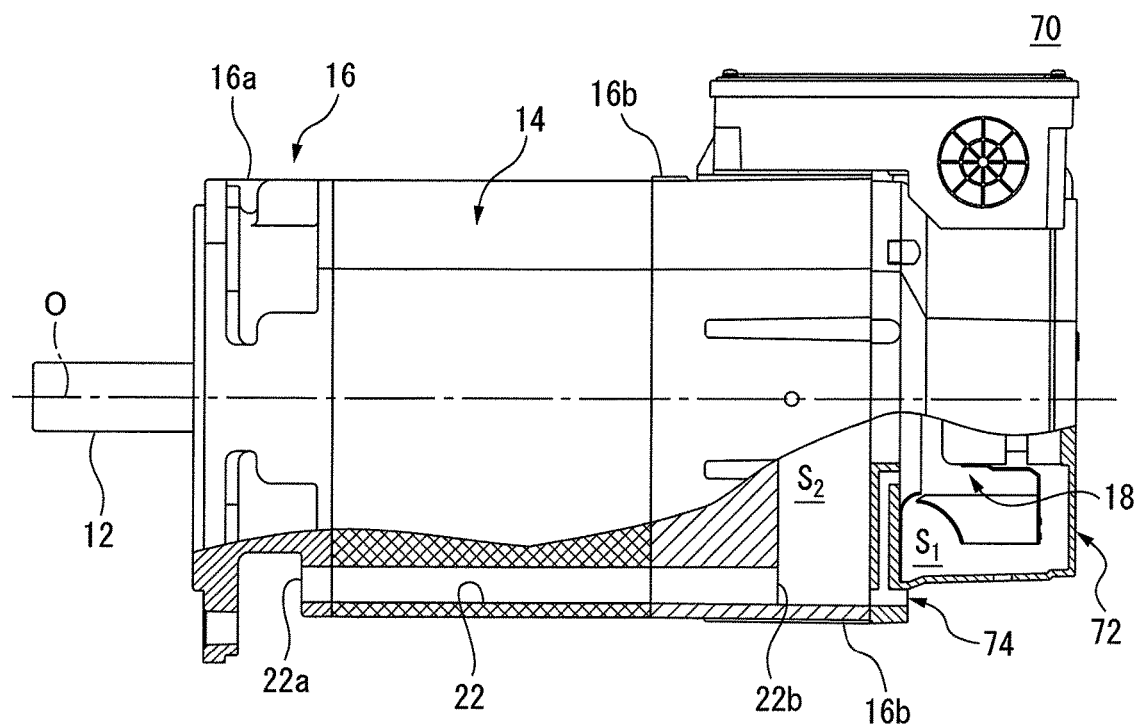
FIG. 10 is a side view of a motor according to still another embodiment of the invention that cross-sectionally illustrates a part of the motor.
Figure 11:
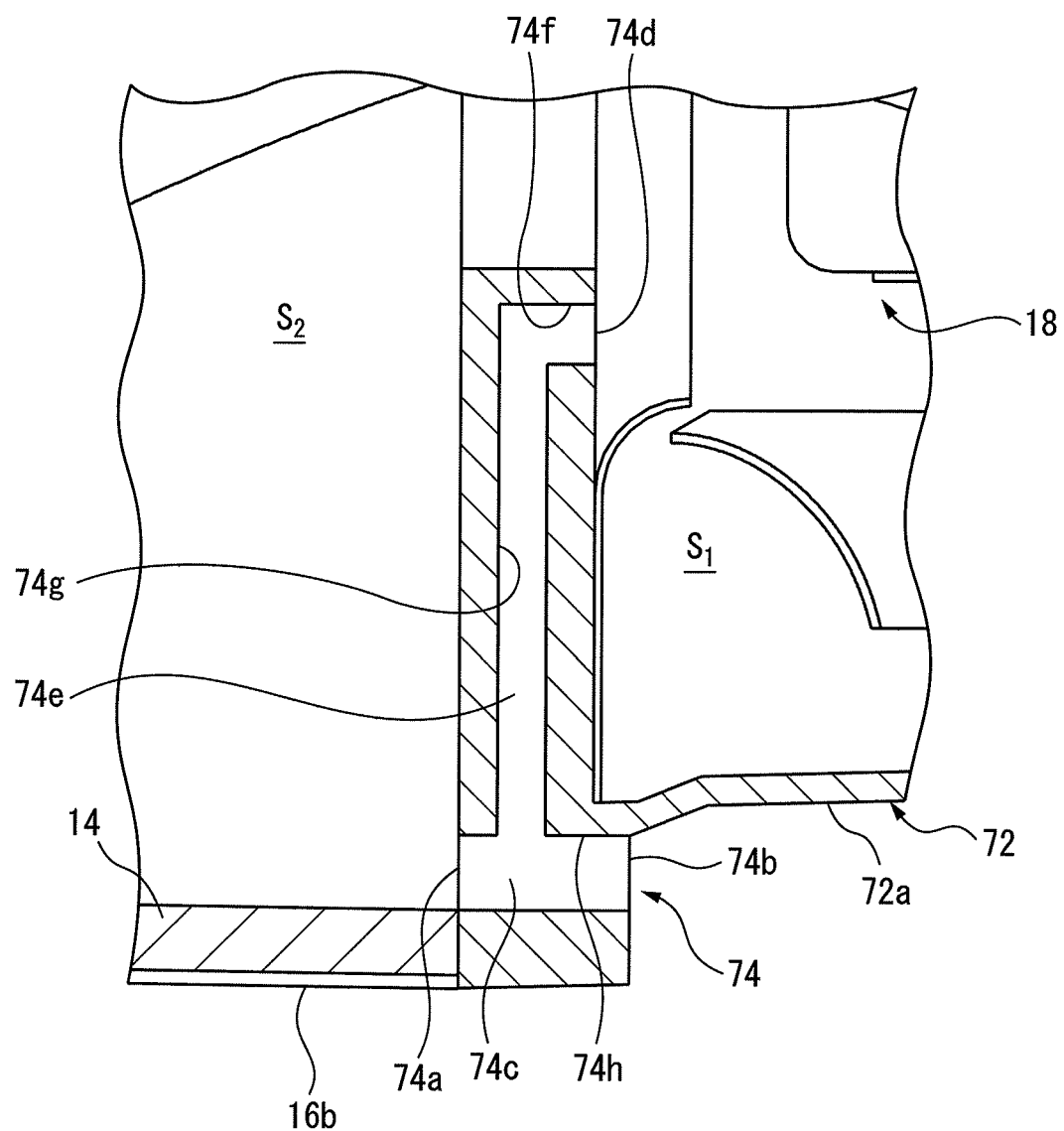
FIG. 11 is an enlarged view of a section in FIG. 10.

Next, a motor 70 according to still another embodiment of the invention will be described with reference to FIGS. 10 and 11. The motor 70 includes the shaft 12, the stator 14, the housing 16, the fan 18, and a fan cover 72.

The fan cover 72 is fixed to the rear housing 16b of the housing 16, and houses the fan 18 in the inner space $S_1$ thereof. Similar to the fan cover 20 shown in FIG. 3, the fan cover 72 is formed with a plurality of fan holes (not shown) which allow an outside air to flow into the inner space $S_1$ and a fluid to flow out of the inner space $S_1$.

The motor 70 further includes a cleaning hole 74 formed at the fan cover 72. As shown in FIG. 11, the cleaning hole 74 includes a first cleaning hole 74c axially extending from an opening 74a (first opening) to an opening 74b (second opening, fourth opening); and a second cleaning hole 74e extending from an opening 74d (third opening) to the opening 74b.

The opening 74a is arranged so as to face the opening 22b at axially rearward of the opening 22b. The opening 74b opens to the outside on an outer surface 72a of the fan cover 72. The opening 74d opens so as to face the fan 18 at axially frontward of the fan 18.

The second cleaning hole 74e includes a first hole part 74f extending axially frontward from the opening 74d; a second hole part 74g extending radially outward from the axially front end of the first hole part 74f so as to be connected to the first cleaning hole 74c; and a third hole part 74h axially extending from a connection part of the second hole part 74g and the first cleaning hole 74c to the opening 74b. The third hole part 74h constitutes a part of the first cleaning hole 74c.

When cleaning the air path 22 and the fan 18 of the motor 70, a compressed fluid is fed into the cleaning hole 74. The compressed fluid introduced into the cleaning hole 74 passes through the first cleaning hole 74c, and a part thereof is discharged from the opening 74a axially frontward.

Since the opening 74a is arranged to face the opening 22b of the air path 22, the compressed fluid discharged from the opening 74a of the first cleaning hole 74c is effectively introduced into the air path 22 from the opening 22b.

Further, the first cleaning hole 74c is formed to extend in the axial direction. Therefore, the compressed fluid passing through the first cleaning hole 74c is oriented so as to be discharged axially frontward, i.e., toward the opening 22b of the air path 22.

Thereby, the discharged compressed fluid can be more effectively introduced into the air path 22. The compressed fluid flowing into the air path 22 from the opening 22b flows axially frontward through the air path 22 while sweeping away dusts adhering to the air path 22, and is discharged from the opening 22a to the outside.

On the other hand, a part of the compressed fluid introduced into the cleaning hole 74 diverges at the connection part of the second hole part 74g and the first cleaning hole 74c, and flows into the second hole part 74g. The compressed fluid flowing into the second hole part 74g passes through the second hole part 74g and the first hole part 74f, and is discharged from the opening 74d axially rearward.

As described above, the opening 74d is arranged to face the fan 18, so the compressed fluid discharged from the opening 74d is effectively blown to the fan 18. Further, the first hole part 74f is formed to extend in the axial direction. Therefore, the compressed fluid passing through the first hole part 74f is oriented so as to be discharged axially rearward, i.e., toward the fan 18.

Thus, according to this embodiment, the first cleaning hole 74c and the second cleaning hole 74e have the common opening 74b from which a compressed fluid is introduced, and the compressed fluid introduced from the opening 74b is led to the air path 22 and the fan 18 by the first cleaning hole 74c and the second cleaning hole 74e, respectively. Thereby, dusts adhering to the air path 22 and the fan 18 can be efficiently swept away by the compressed fluid.

Figure 12:
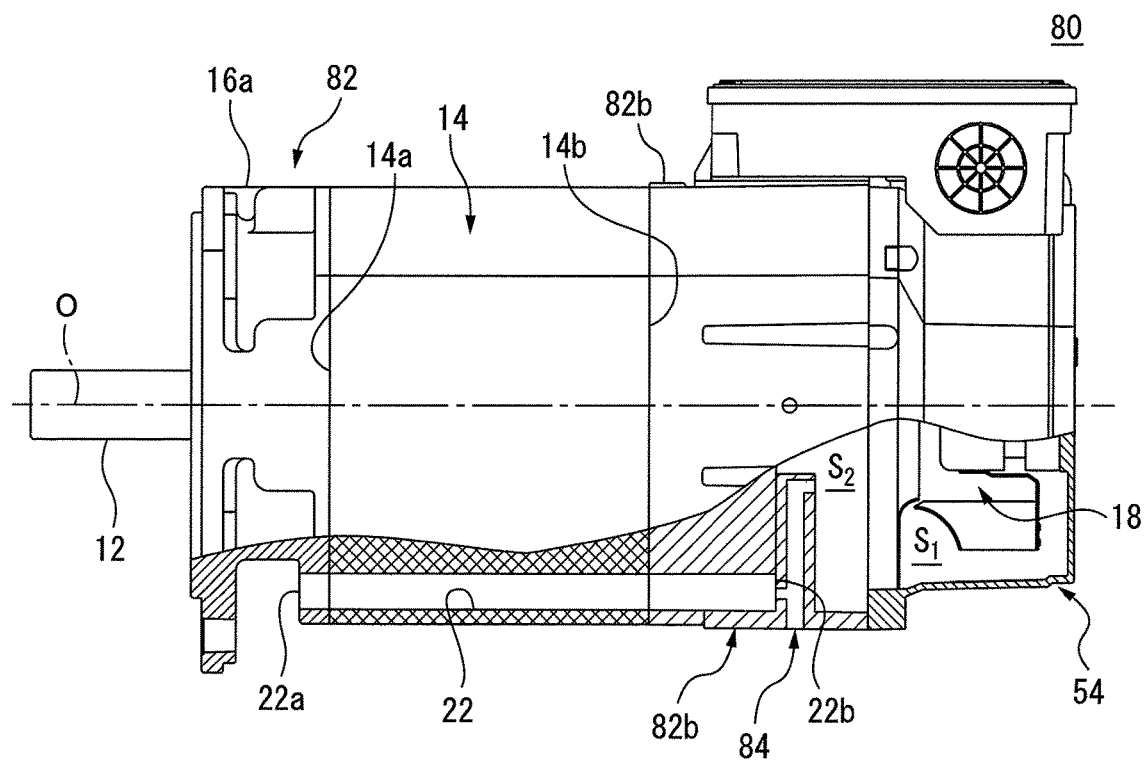
FIG. 12 is a side view of a motor according to still another embodiment of the invention, in which a part of the motor is shown cross-sectionally.

Next, a motor 80 according to still another embodiment of the invention will be described with reference to FIGS. 12 and 13. The motor 80 includes the shaft 12, the stator 14, a housing 82, the fan 18, and the fan cover 54.

In this embodiment, the housing 82 includes the front housing 16a similar to that in the above-mentioned embodiments; and a rear housing 82b arranged at the axially rear end 14b of the stator 14. The motor 80 further includes a cleaning hole 84 formed at the rear housing 82b.

Figure 13:
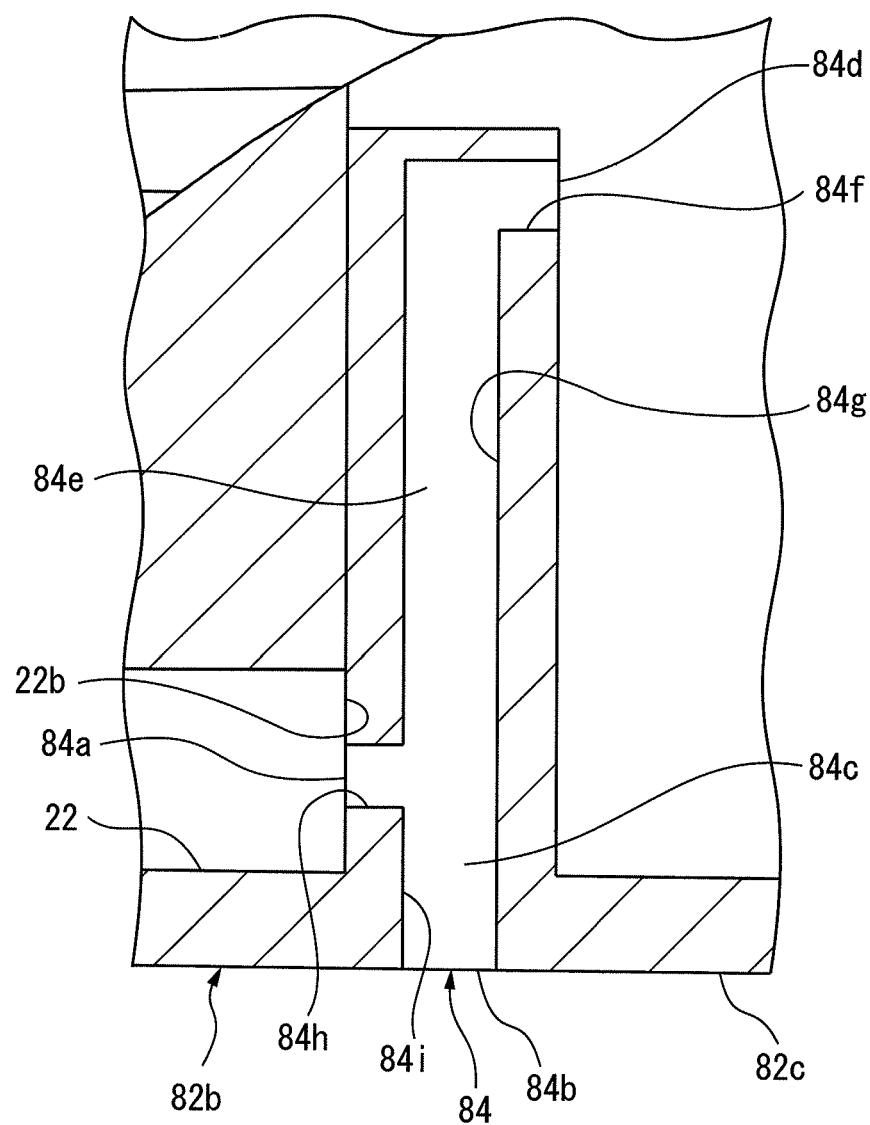
FIG. 13 is an enlarged view of a section in FIG. 12.

As shown in FIG. 13, the cleaning hole 84 includes a first cleaning hole 84c extending from an opening 84a (first opening) to an opening 84b (second opening, fourth opening); and a second cleaning hole 84e extending from an opening 84d (third opening) to the opening 84b.

The opening 84a is arranged at axially rear side of the opening 22b of the passage 22 so as to adjoin the opening 22b. In other words, the opening 84a is arranged so that the whole region thereof overlaps with the opening 22b of the air path 22. The opening 84b opens to the outside on an outer surface 82c of the rear housing 82b. The opening 84d opens so as to face the fan 18 at axially frontward of the fan 18.

The second cleaning hole 84e includes a first hole part 84f extending axially frontward from the opening 84d; and a second hole part 84g radially extending from the axially front end of the first hole part 84f to the opening 84b.

On the other hand, the first cleaning hole 84c includes a third hole part 84h extending axially rearward from the opening 84a so as to be connected to the second hole part 84g; and a fourth hole part 84i radially extending from the connection part of the second hole part 84g and the third hole part 84h to the opening 84b. The fourth hole part 84i constitutes a part of the second hole part 84g.

When cleaning the air path 22 and the fan 18 of the motor 80, a compressed fluid is fed into the cleaning hole 84. A part of the compressed fluid introduced into the cleaning hole 84 passes through the first cleaning hole 84c, and is discharged from the opening 84a. Since the opening 84a is arranged to adjoin the opening 22b of the air path 22, the compressed fluid passing through the first cleaning hole 84c is reliably introduced into the air path 22.

On the other hand, a part of the compressed fluid introduced into the cleaning hole 84 passes through the second cleaning hole 84e and is discharged from the opening 84d. Since the opening 84d is arranged to face the fan 18, the compressed fluid discharged from the opening 84d is effectively blown to the fan 18.

Thus, according to this embodiment, the first cleaning hole 84c and the second cleaning hole 84e have the common opening 84b from which the compressed fluid is introduced, and the compressed fluid introduced from the opening 84b is led to the air path 22 the fan 18 by the first cleaning hole 84c and the second cleaning hole 84e, respectively. Thereby, it is possible to effectively sweep out the dusts adhering to the air path 22 and the fan 18.

Figure 14:
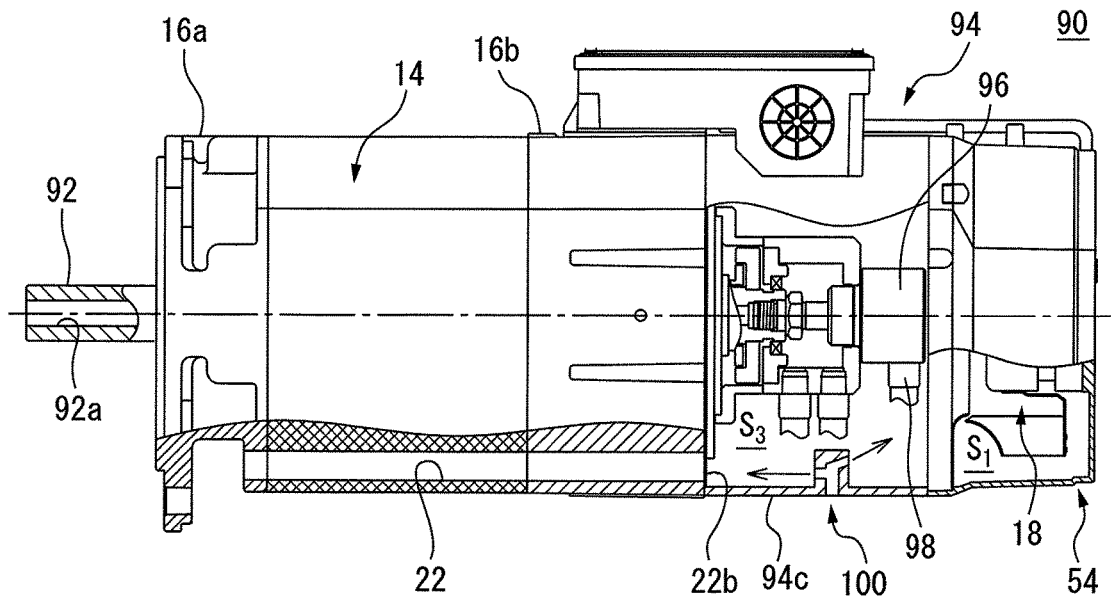
FIG. 14 is a side view of a motor according to still another embodiment of the invention, in which a part of the motor is shown cross-sectionally.
Figure 15:
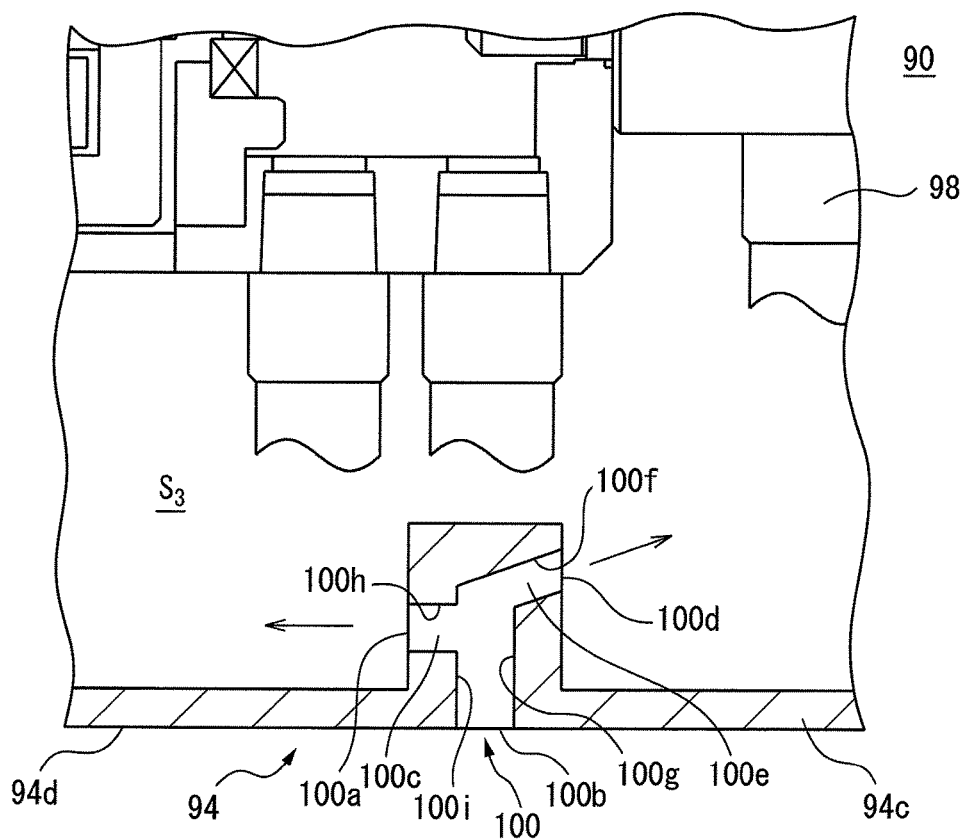
FIG. 15 is an enlarged view of a section in FIG. 14.

Next, a motor 90 according to still another embodiment of the invention will be described with reference to FIGS. 14 and 15. The motor 90 includes a shaft 92, the stator 14, a housing 94, the fan 18, and the fan cover 54.

The shaft 92 is provided so as to be rotatable relative to the stator 14, and the rotor having a magnet (not shown) is fixed to the radially outside of the shaft 92. In this embodiment, the shaft 92 includes a through hole 92a axially penetrating the shaft 92.

The housing 94 includes the front housing 16a and the rear housing 16b similar to those in the embodiments as described above, and a hollow part 94c. The hollow part 94c is fixed to the axially rear end of the rear housing 16b so as to extend between the rear housing 16b and the fan cover 54.

The hollow part 94c defines an inner space $S_3$ which is in fluid communication with the air path 22 and the inner space $S_1$ of the fan cover 54. A rotary joint 96 is provided in the inner space $S_3$. The rotary joint 96 receives the shaft 92 in a rotatable manner, and includes an inner space (not shown) which is in fluid communication with the through hole 92*a* of the shaft 92.

A fluid supply tube 98 extending from an external fluid supply device (not shown) is connected to the rotary joint 96, and a fluid supplied from the fluid supply device is fed into the through hole 92*a* via the rotary joint 96.

The motor 90 according to this embodiment includes a cleaning hole 100 formed at the hollow part 94*c*. As shown in FIG. 15, the cleaning hole 100 includes a first cleaning hole 100*c* extending from an opening 100*a* (first opening) to an opening 100*b* (second opening, fourth opening); and a second cleaning hole 100*e* extending from an opening 100*d* (third opening) to the opening 100*b*.

The opening 100*a* is arranged so as to face the opening 22*b* of the passage 22 at axially rearward of the opening 22*b*. The opening 100*b* opens to the outside on an outer surface 94*d* of the hollow part 94*c*. The opening 100*d* opens so as to face the fan 18 at axially frontward of the fan 18.

The second cleaning hole 100*e* includes a first hole part 100*f* extending from the opening 100*d* axially frontward and radially outward so as to be slanted relative to the axial direction; and a second hole part 100*g* radially extending from the axially front end of the first hole part 100*f* to the opening 100*b*.

On the other hand, the first cleaning hole 100*c* includes a third hole part 100*h* extending from the opening 100*a* axially rearward so as to be connected to the second hole part 100*g*; and a fourth hole part 100*i* radially extending from the connection part of the second hole part 100*g* and the third hole part 100*h* to the opening 100*b*. The fourth hole part 100*i* constitutes a part of the second hole part 100*g*.

When cleaning the air path 22 and the fan 18 of the motor 90, a compressed fluid is fed into the cleaning hole 100. A part of the compressed fluid introduced into the cleaning hole 100 passes through the first cleaning hole 100*c*, and is discharged from the opening 100*a*. Since the opening 100*a* is arranged to face the opening 22*b* of the air path 22, the compressed fluid discharged from the opening 100*a* is effectively introduced into the air path 22.

On the other hand, a part of the compressed fluid introduced into the cleaning hole 100 passes through the second cleaning hole 100*e*, and is discharged from the opening 100*d*. Since the opening 100*d* is arranged to face the fan 18, the compressed fluid discharged from the opening 100*d* is effectively blown to the fan 18.

Thus, according to this embodiment, the first cleaning hole 100*c* and the second cleaning hole 100*e* have the common opening 100*b* from which the compressed fluid is introduced, and the compressed fluid introduced from the opening 100*b* is led to the air path 22 and the fan 18 by the first cleaning hole 100*c* and the second cleaning hole 100*e*, respectively. Thereby, it is possible to effectively sweep out dusts adhering to the air path 22 and the fan 18 by the compressed fluid.

Further, in this embodiment, the first hole part 100*f* constituting the second cleaning hole 100*e* is formed to extend so as to be slanted relative to the axial direction. The inclination angle of the first hole part 100*f* relative to the axial direction is determined so that the extension direction of the first hole part 100*f* intersects an element of the fan 18 (for example, the center of the rotation body of the fan).

According to this configuration, the flow of the compressed fluid discharged from the opening 100*d* can be oriented in a direction toward the fan 18, more effectively. As a result, it is possible to more effectively sweep out dusts adhering to the fan 18 by the compressed fluid discharged from the opening 100*d*.

Figure 16:
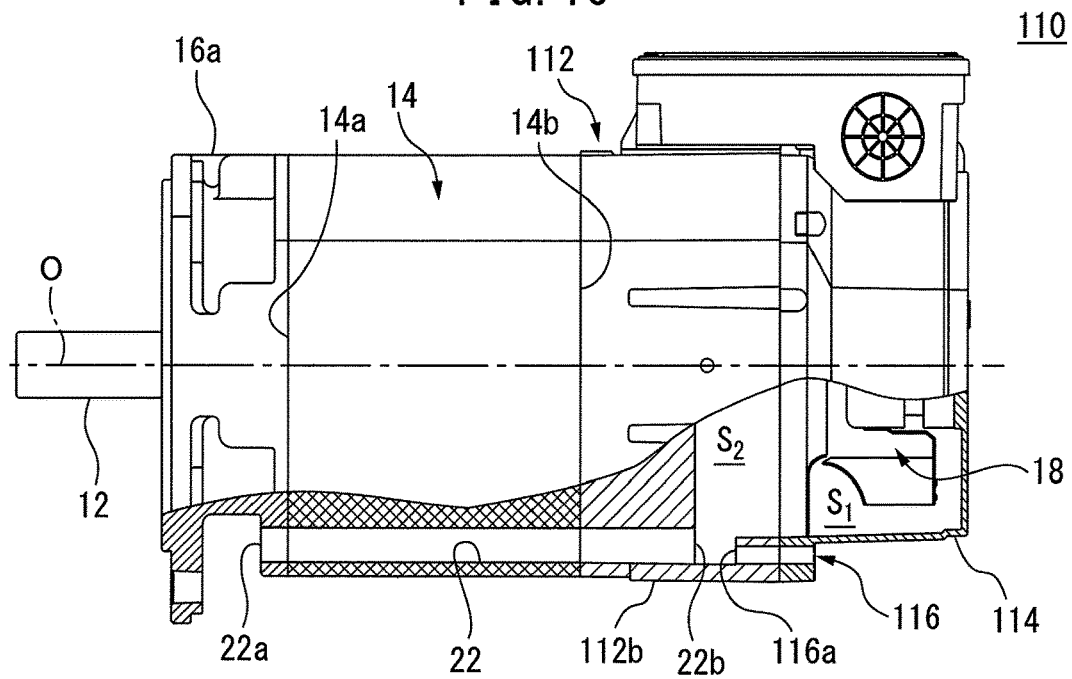
FIG. 16 is a side view of a motor according to still another embodiment of the invention, in which a part of the motor is shown cross-sectionally.
Figure 17:
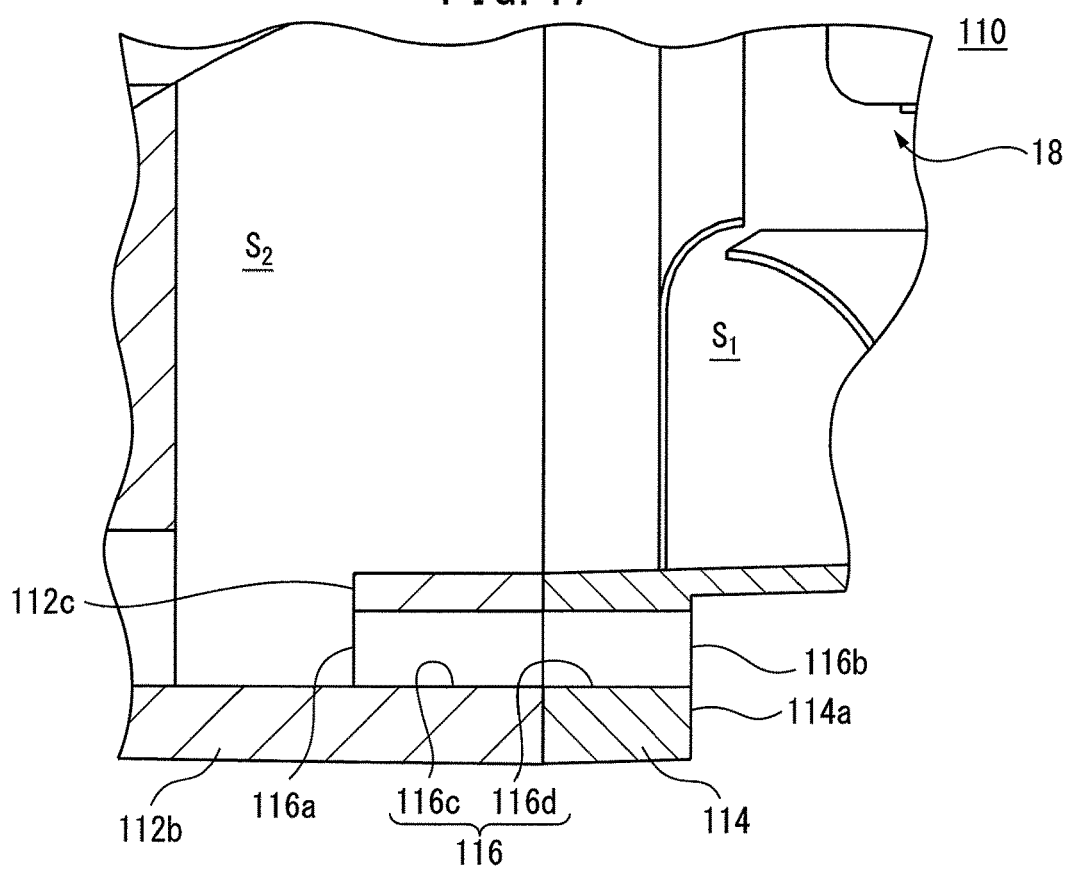
FIG. 17 is an enlarged view of a section in FIG. 16.

Next, a motor 110 according to still another embodiment of the invention will be described with reference to FIGS. 16 and 17. The motor 110 includes the shaft 12, the stator 14, a housing 112, the fan 18, and a fan cover 114.

The housing 112 includes the front housing 16*a* similar to that in the above-mentioned embodiments; and a rear housing 112*b* arranged at the axially rear end 14*b* of the stator 14. The fan cover 114 is fixed to the rear housing 112*b*, and houses the fan 18 in the inner space $S_1$ thereof.

The motor 110 according to this embodiment includes a (first) cleaning hole 116 formed at the rear housing 112*b* and the fan cover 114. As shown in FIG. 17, the cleaning hole 116 includes a first hole part 116*c* formed at the rear housing 112*b*; and a second hole part 116*d* formed at the fan cover 114 so as to be in fluid communication with the first hole part 116*c*.

The first hole part 116*c* extends axially rearward from an opening 116*a* (first opening) formed on the inner surface 112*c* of the rear housing 112*b* so as to axially penetrate the rear housing 112*b*. The opening 116*a* is arranged at axially rearward of the opening 22*b* of the air path 22 to face the opening 22*b*.

On the other hand, the second hole part 116*d* extends axially frontward from an opening 116*b* (second opening) formed on the outer surface 114*a* of the fan cover 114 so as to open to the outside, and axially penetrates the fan cover 114.

The first hole part 116*c* and the second hole part 116*d* are arranged so as to straightly align in the axial direction. The inner wall of the first hole part 116*c* is threaded.

Figure 18:
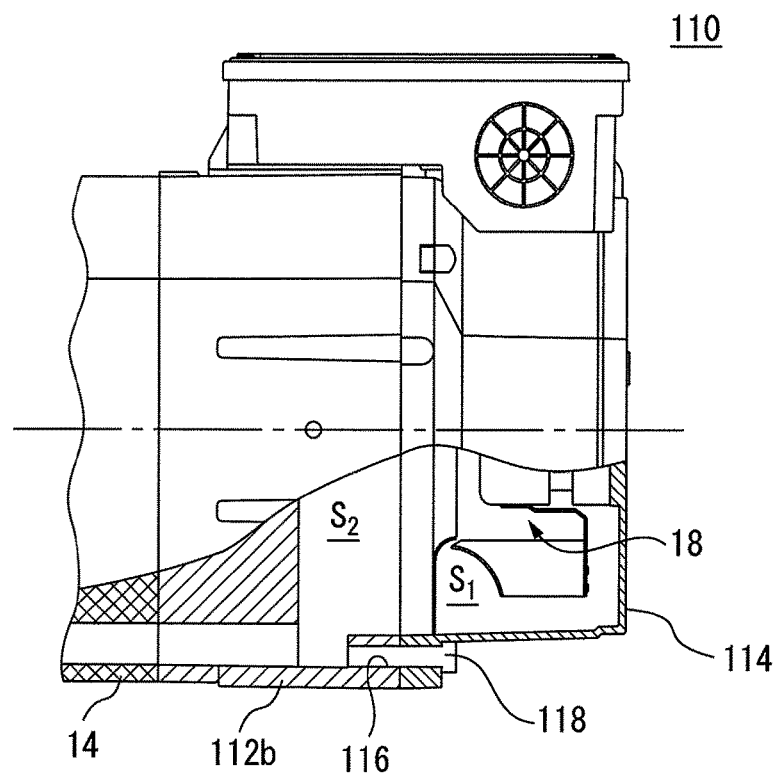
FIG. 18 is a diagram illustrating a state where a bolt is inserted into the cleaning hole shown in FIG. 16.

The cleaning hole 116 according to this embodiment ordinarily functions as a bolt hole for fixing the rear housing 112*b* and the fan cover 114 to each other. Specifically, as shown in FIG. 18, a bolt 118 is inserted into the cleaning hole 116 to as to be screwed into the threaded part formed at the inner wall of the first hole part 116*c*. Thereby, the rear housing 112*b* and the fan cover 114 can be bolted with each other.

On the other hand, when cleaning the motor 110, the bolt 118 is removed from the cleaning hole 116, and a compressed fluid is fed into the cleaning hole 116. The compressed fluid introduced into the cleaning hole 116 is discharged from the opening 116*a* axially frontward.

Since the opening 116*a* is arranged to face the opening 22*b* of the air path 22, the compressed fluid discharged from the opening 116*a* is effectively introduced into the air path 22 from the opening 22*b*. Thereby, dusts adhering to the air path 22 can be swept away.

Thus, according to this embodiment, the inner wall of the cleaning hole 116 is threaded, and the cleaning hole 116 functions as a bolt hole and also as, a hole for introducing the compressed fluid. Due to this configuration, it is possible to easily clean the inside of the motor 110, while the number of holes to be formed and the number of components can be reduced.

Figure 19:
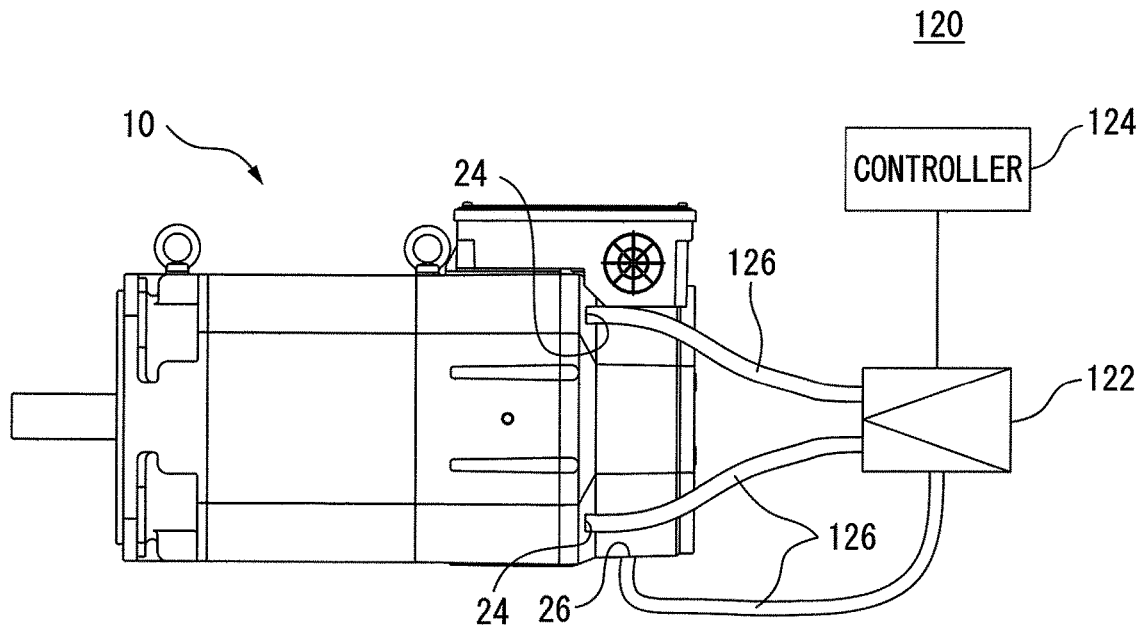
FIG. 19 is a diagram of a cleaning system according to an embodiment of the invention.

Next, a cleaning system 120 according to an embodiment of the invention will be described with reference to FIG. 19. The cleaning system 120 is for cleaning the air path 22 and the fan 18 of the motor 10 described above.

The cleaning system 120 includes a fluid supply device 122 for supplying a compressed fluid into the first cleaning hole 24 and the second cleaning hole 26; and a controller 124 which controls the fluid supply device 122. A plurality of fluid supply tubes 126 are connected to the fluid supply device 122, and each of the fluid supply tubes 126 is connected to each of the first holes 24 and second hole 26.

The fluid supply device 122 generates a compressed fluid inside thereof, and supplies it to each of the first cleaning holes 24 and the second cleaning hole 26 via the fluid supply tubes 126. When a compressed gas is supplied as the compressed fluid, the fluid supply device 122 is comprised of e.g. a compressor.

The controller 124 controls a flow rate, a pressure, a timing, or supply time of the compressed fluid supplied by the fluid supply device 122. Note that, when the motor 10 is installed in a machine tool, the controller 124 may be incorporated in a machine tool controller for controlling the machine tool. In this case, the machine tool controller functions as the controller 124 so as to control the operation of the fluid supply device 122.

Note that, in this embodiment, the cleaning system 120 is used to clean the motor 10. However, it would be easily understood that the cleaning system 120 can also clean the motor 40, 50, 60, 70, 80, 90, or 110.

In this case, each fluid supply tube 126 is connected to each cleaning hole 56, 64, 74, 84, 100, or 116 of the motor 40, 50, 60, 70, 80, 90, or 110, and a compressed fluid is supplied from the fluid supply device 122 through the fluid supply tube 126.

Note that, in the above-mentioned embodiments, a case is described where the air path 22 is formed at the stator 14. However, the air path may be provided as a member other than the stator, and arranged adjacent to the stator. For example, a housing, such as a cooling jacket, may be provided at an outer periphery of the stator, wherein the air path may be provided at the housing.

Further, at least two of the cleaning holes 24, 26, 56, 64, 74, 84, 100, and 116 may be provided in one motor. Further, at least two features included in the various embodiments described above may be combined. For example, the inner wall of each of the cleaning holes 24, 26, 56, 64, 74, 84, and 100 may be threaded, as in the cleaning hole 116.

The invention has been described through the embodiments of invention, but the embodiments as described above are not intended to limit the invention as in the appended claims. In addition, embodiments in which the features described in the embodiments of the invention are combined can be included in the technical scope of the invention, but not all the combinations of these features are essential for solution of the invention. Further, it is also apparent to a person skilled in the art that various modifications and improvements can be added to the embodiments as described above.

The invention claimed is:

1. A motor comprising:
a stator having a proximal end and a distal end;
a housing which holds the stator, the housing having a proximal end and a distal end;
a fan arranged outside the stator near the stator's distal end, the fan generating a cooling gas flow that flows in a direction from the proximal end of the stator to the distal end of the stator;
a fan cover mounted on the distal end of the housing so as to house the fan;
an air path provided at the stator or the housing, and including an inlet located at the proximal end of the stator or the housing and an outlet located at the distal end of the stator or the housing for the cooling gas flow, the air path having an air path axial centerline passing through the inlet and the outlet;
a first cleaning hole formed at the stator, the housing, or the fan cover, and extending axially from a first opening which faces the outlet at a position downstream of the cooling gas flow to a second opening which opens to an outside, the first cleaning hole including a portion extending axially from the first opening, the portion having a center line parallel to the air path axial centerline; and
a removable plug located in the first cleaning hole which can be removed in order to provide compressed air into the first cleaning hole to perform a cleaning operation.

2. The motor according to claim 1, comprising:
a plurality of air paths; and
a plurality of first cleaning holes arranged to face the respective air paths.

3. The motor according to claim 1, wherein the first opening is arranged at a position separated from the outlet so as to face the outlet.

4. The motor according to claim 1, wherein an inner wall of the first cleaning hole is threaded.

5. The motor according to claim 1, wherein the housing includes a hollow part extending between the stator and the fan cover, and having an inner space which is in fluid communication with the air path and the inside of the fan cover,
the first cleaning hole is formed at the hollow part.

6. A cleaning system for cleaning the inside of the motor according to claim 1, comprising:
a fluid supply device which supplies a compressed fluid into the first cleaning hole; and
a controller which controls the fluid supply device.

7. The motor according to claim 1, further comprising a second cleaning hole formed at the stator, the housing, or the fan cover, and extending from a third opening which opens to face the fan to a fourth opening which opens to the outside.

8. The motor according to claim 7, wherein the second opening and the fourth opening are the same one opening, the second cleaning hole extends from the third opening so as to be connected to the first cleaning hole.

* * * * *